United States Patent
Jeong et al.

(10) Patent No.: US 8,463,436 B2
(45) Date of Patent: Jun. 11, 2013

(54) APPARATUS, METHOD AND MEDIUM FOR SIMULTANEOUSLY PERFORMING CLEANING AND CREATION OF MAP FOR MOBILE ROBOT

(75) Inventors: Woo-yeon Jeong, Seoul (KR); Su-Jin Lee, Yongin-si (KR); Hyeon Myeong, Suwon-si (KR); Seok-Won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1384 days.

(21) Appl. No.: 12/215,400

(22) Filed: Jun. 27, 2008

(65) Prior Publication Data

US 2009/0055020 A1 Feb. 26, 2009

(30) Foreign Application Priority Data

Jun. 28, 2007 (KR) ........................ 10-2007-0064609

(51) Int. Cl.
*G05B 19/042* (2006.01)
*A47L 11/00* (2006.01)

(52) U.S. Cl.
USPC ...................... 700/253; 700/245; 318/568.12

(58) Field of Classification Search
USPC .................. 134/113, 18, 57 R; 701/23, 209, 701/208, 200, 25, 28; 340/995.1, 995.17; 700/253, 245, 258; 901/1, 50; 318/568.12, 318/568.16; 15/319

See application file for complete search history.

(56) References Cited

U.S. PATENT DOCUMENTS

| | | | |
|---|---|---|---|
| 5,402,051 A | | 3/1995 | Fujiwara et al. |
| 5,471,391 A | * | 11/1995 | Gudat et al. ..................... 701/50 |
| 6,009,359 A | * | 12/1999 | El-Hakim et al. .............. 701/28 |
| 6,496,754 B2 | * | 12/2002 | Song et al. ..................... 700/245 |
| 6,934,615 B2 | * | 8/2005 | Flann et al. .................... 701/50 |
| 7,272,474 B1 | * | 9/2007 | Stentz et al. ................... 701/26 |
| 7,805,220 B2 | * | 9/2010 | Taylor et al. .................. 700/253 |
| 2005/0075784 A1 | * | 4/2005 | Gray et al. ..................... 701/201 |
| 2005/0288079 A1 | * | 12/2005 | Tani ................................ 463/1 |
| 2008/0009967 A1 | * | 1/2008 | Bruemmer .................... 700/245 |
| 2010/0286905 A1 | * | 11/2010 | Goncalves et al. ........... 701/200 |

FOREIGN PATENT DOCUMENTS

| | | |
|---|---|---|
| JP | 5-46239 | 2/1993 |
| JP | 2005-211359 | 8/2005 |

* cited by examiner

*Primary Examiner* — Christine Behncke
(74) *Attorney, Agent, or Firm* — Staas & Halsey LLP

(57) ABSTRACT

Provided is an apparatus, method, and medium for allowing a mobile robot to simultaneously perform a cleaning process and a map-creating process. The apparatus includes a feature-map-creating unit creating a feature map for recognizing the position of a mobile robot; a path-map-creating unit creating a path map including a plurality of cells, each having information about whether an obstacle exists and path information, on the basis of information on the pose of the mobile robot that is obtained from the feature map; and a motion-control unit moving the mobile robot on the basis of the information about whether the obstacle exists and the path information.

16 Claims, 6 Drawing Sheets

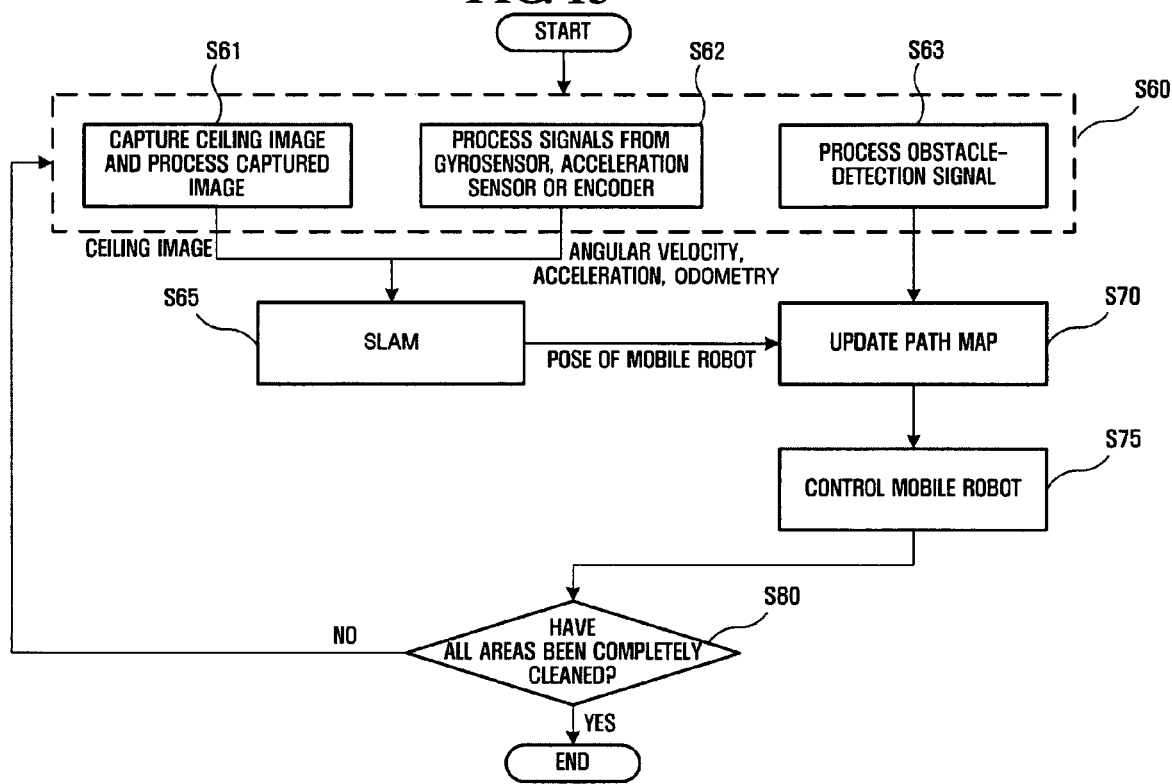

APPARATUS, METHOD AND MEDIUM FOR SIMULTANEOUSLY PERFORMING CLEANING AND CREATION OF MAP FOR MOBILE ROBOT

CROSS-REFERENCE TO RELATED APPLICATIONS

This application claims priority benefit from Korean Patent Application No. 10-2007-0064609 filed on Jun. 28, 2007 in the Korean Intellectual Property Office, the disclosure of which is incorporated herein by reference in its entirety.

BACKGROUND

1. Field

The present invention relates to a mobile robot, and, more particularly, to an apparatus, method, and medium for allowing a mobile robot to simultaneously perform a cleaning process and a map-creating process.

2. Description of the Related Art

In general, industrial robots were developed to improve factory automation, and perform manufacturing processes in extreme environments in which the humans cannot work. In recent years, robotics technology has been used in the space industry, which has lead to the development of human-friendly home service robots. In addition, robots can be inserted into the human body instead of medical instruments to treat a minute cellular texture, which is untreatable using existing medical instruments. Robotics technology has drawn attention as possible technology to follow the information revolution caused by the development of the Internet and biotechnology.

Home service robots, such as cleaning robots, have played a leading role in the expansion of robotics technology focused on industrial robots used for only heavy industries to robotics technology focused on light industries. The cleaning robot generally includes a driving unit for movement, a cleaning unit, and a positioning unit for measuring the position of a user or a remote controller.

In the mobile robots, such as cleaning robots, it is a basic and important function to check its exact position. The absolute position of the mobile robot can be calculated by the following methods: installing a beacon having an ultrasonic sensor in the home; using indoor GPS (global positioning system). In addition, the relative position of the mobile robot can be calculated by the following methods: calculating the rotational speed of a mobile robot and the linear speed of the mobile robot using an encoder and integrating the speeds; integrating an acceleration value obtained by an acceleration sensor twice; and integrating the rotational speed of the mobile robot, which is the output of a gyro-sensor, to calculate a traveling direction.

However, the mobile robot needs to create a map in order to perform a specific process, such as cleaning, in a space. In order to create the map, a separate algorithm for exploring an unknown area in addition to SLAM (simultaneous localization and mapping) is needed. The following methods are used as the algorithm: determining the overall shape of a space using wall-following; and planning a coverage path using active SLAM. After the map is created by the above-mentioned methods, a separate coverage-path-planning process for allowing the mobile robot to clean all of the areas included in the map is needed.

That is, in the related art, the mobile robot needs to perform a position-recognizing process for creating a map, a map-creating process, and a coverage-path-planning process for cleaning the entire space using the created map, in order to clean the entire space. As a result, cleaning time is lengthened. In addition, the accuracy of the map is important to make the coverage-path plan for cleaning the entire space, but an inexpensive obstacle sensor cannot meet the accuracy requirement. In particular, when a sensor provided in the mobile robot has a short sensing distance, it is difficult to create a map for the entire space using only a wall-following method.

SUMMARY

In an aspect of the present invention, there is provided an apparatus, method, and medium capable of measuring the position of a mobile robot in real time using a position-recognizing module and an obstacle sensor, and allowing the mobile robot to simultaneously perform a cleaning process and a map-creating process according to a coverage-path plan.

According to an aspect of the present invention, there is provided an apparatus for simultaneously performing a cleaning process and a map creating process for a mobile robot, the apparatus including a feature-map-creating unit to create a feature map for recognizing position of the mobile robot; a path-map-creating unit to create a path map including a plurality of cells, each cell having information about whether an obstacle exists and path information, on the basis of information on pose of the mobile robot that is obtained from the feature map; and a motion-control unit to move the mobile robot on the basis of the information about whether the obstacle exists and the path information.

According to another aspect of the present invention, there is provided a method for simultaneously performing cleaning and creating a map for a mobile robot, the method including creating a feature map for recognizing position of the mobile robot; creating a path map including a plurality of cells, each cell having information about whether an obstacle exists and path information, on the basis of information on pose of the mobile robot that is obtained from the feature map; and moving the mobile robot on the basis of the information about whether the obstacle exists and the path information.

According to another aspect of the present invention, there is provided at least one computer-readable recording medium storing computer readable instructions to implement methods of the present invention.

BRIEF DESCRIPTION OF THE DRAWINGS

These and/or other aspects, features, and advantages will become apparent and more readily appreciated from the following description of the embodiments, taken in conjunction with the accompanying drawings of which:

FIG. 13 is a flowchart illustrating a method of creating a map for a mobile robot according to an exemplary embodiment of the invention.

DETAILED DESCRIPTION OF EMBODIMENTS

Figure 1:
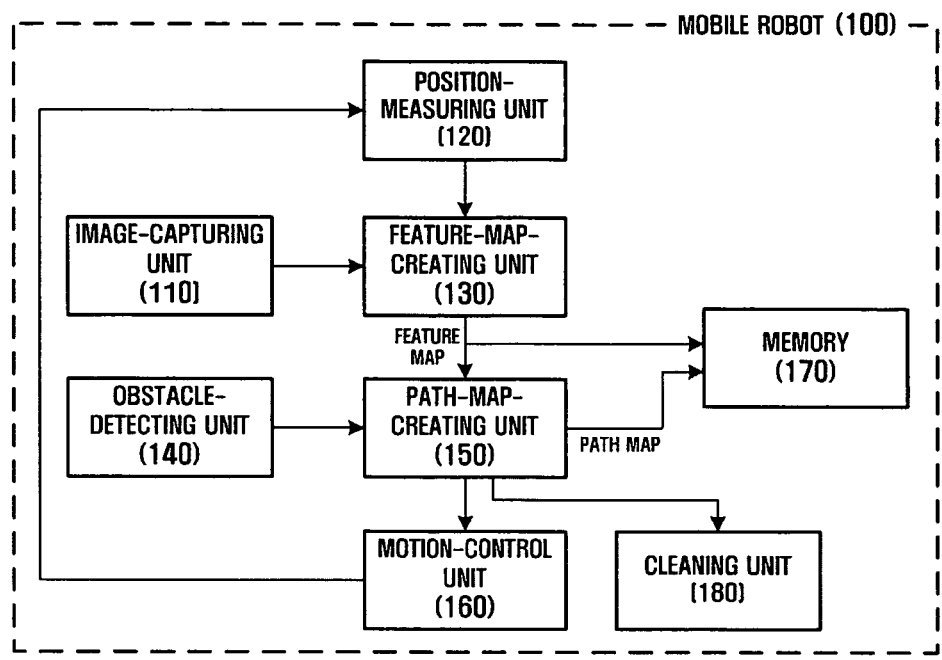
FIG. 1 is a block diagram illustrating the structure of a mobile robot according to an exemplary embodiment of the invention.

Reference will now be made in detail to exemplary embodiments, examples of which are illustrated in the accompanying drawings, wherein like reference numerals refer to the like elements throughout. Exemplary embodiments are described below to explain the present invention by referring to the figures.

Exemplary embodiments of the present invention include two technical characteristics. First, a moving path of a mobile robot is controlled while creating a dual structure map containing a positioning map and a path-planning map, thereby simultaneously performing cleaning and map creation. That is, the next cleaning point in the entire space is generated according to the path-planning map created by the moving mobile robot, and the positioning map is created on the basis of a peripheral image (for example, a ceiling image, a wall image, or a floor image). Second, a general grid map is modified, and information on the moving path of the mobile robot is added to each cell, thereby showing a path for cleaning.

FIG. 1 is a block diagram illustrating the structure of a mobile robot 100 according to an exemplary embodiment of the invention. The mobile robot 100 may include an image-capturing unit 110, a position-measuring unit 120, a feature-map-creating unit 130, an obstacle-detecting unit 140, a path-map-creating unit 150, a motion-control unit 160, a memory 170, and a cleaning unit 180.

The image-capturing unit 110 captures a peripheral image suitable for extracting feature points. The peripheral image may include a ceiling image, a wall image, and a floor image, but the image of the ceiling is most suitable for the peripheral image because the ceiling has a lighting that has little variation in image and is suitable for extracting feature points provided thereon. In this exemplary embodiment of the invention, the ceiling image is used as the peripheral image. The image-capturing unit 110 may be composed of one of a CCD (charge coupled device), a CMOS (complementary metal oxide semiconductor), and other image-capturing devices, and includes an A/D (analog-to-digital) converter for converting analog signals of a captured image to digital signals.

The position-measuring unit 120 measures the position of the mobile robot 100 using a relative position recognizing sensor, such as an encoder, a gyro-sensor, or an acceleration sensor. The position-measuring unit 120 may measure the position of the mobile robot 100 using an absolute-position-recognizing module, such as a beacon-signal receiver. The encoder is connected to traveling wheels included in the motion-control unit 160 to detect the rotational speed of the traveling wheels. The rotational speed detected by the encoder is integrated to know the position (moving distance) and head angle of the mobile robot 100. Similarly, the gyro-sensor can measure the head angle of the mobile robot 100 using rotational inertia. The acceleration sensor integrates the acceleration of the mobile robot 100 twice to measure the position of the mobile robot 100. In general, the position and the head angle are called a "pose".

Figure 2:
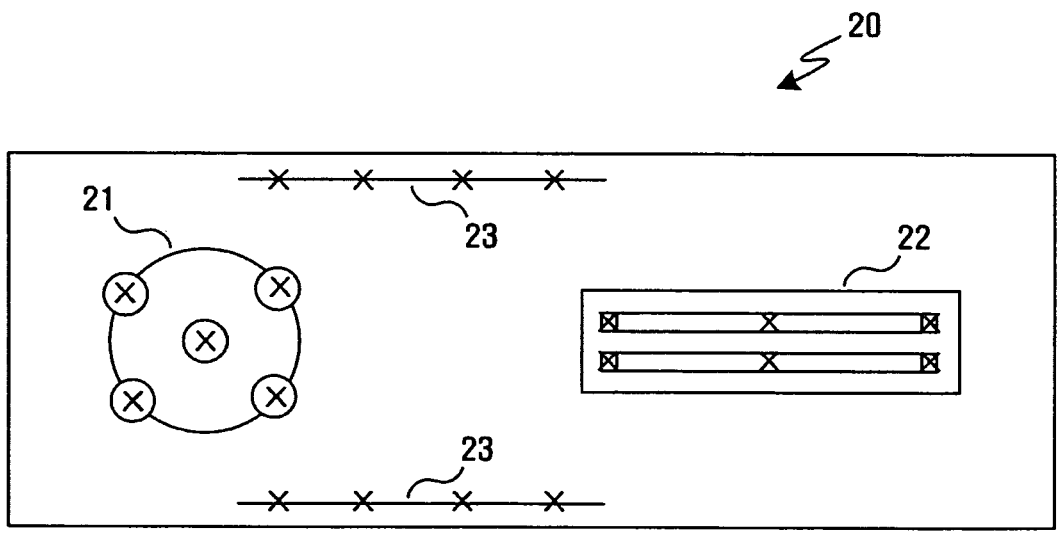
FIG. 2 is a diagram illustrating feature points extracted from a ceiling image.

The feature-map-creating unit 130 extracts a plurality of feature points from the ceiling image captured by the image-capturing unit 110 to create a feature map. SLAM is an algorithm for simultaneously performing the positioning of the mobile robot 100 and the creation of a map, and the created map is a positioning feature map. The feature map may include feature points that are constantly measured in peripheral environments. The feature points may be points indicating characteristics of a specific position. For example, when a ceiling image 20 shown in FIG. 2 is captured, the ceiling image 20 may include detailed images of a chandelier 21, a fluorescent lamp 22, and edges 23 that are discriminated from other positions. When a plurality of feature points are indicated on the detailed images and the mobile robot 100 detects the indicated feature points on the captured image while moving, it is possible to check the absolute position of the mobile robot 100.

Figure 3:
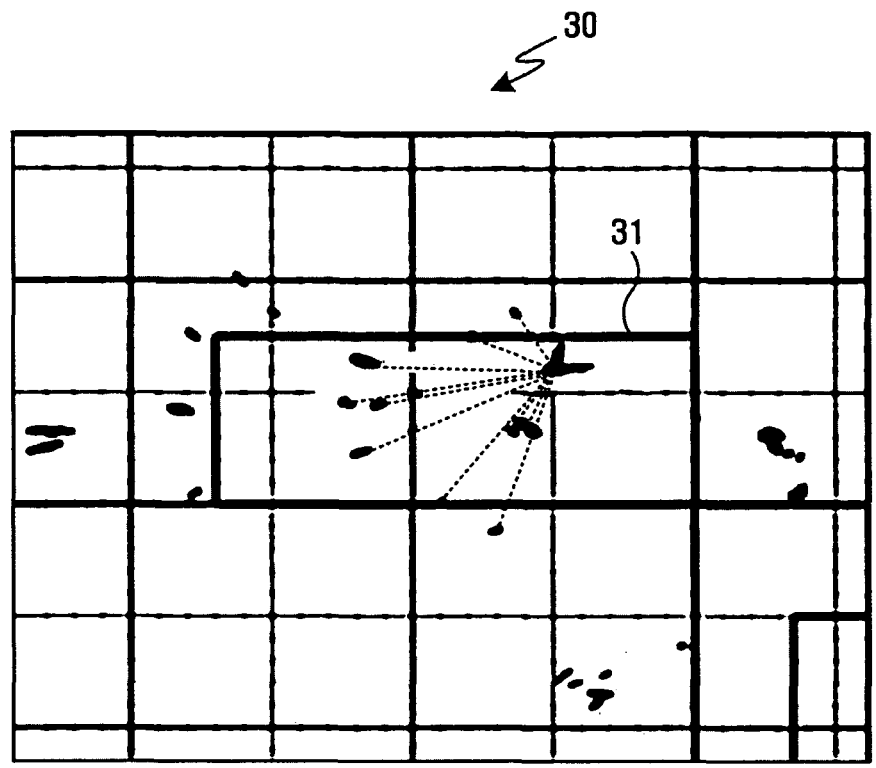
FIG. 3 is a diagram illustrating an example of a created feature map.

FIG. 3 is a diagram illustrating an example of the feature map that is actually created. A feature map 30 includes various types of feature points, and adjacent feature points are connected to each other. If a combination of predetermined feature points is found in an image 31 captured by the mobile robot 100, it is possible to know the exact position and head angle of the mobile robot 100. Algorithms for extracting feature points from a captured ceiling image include a SIFT (scale invariant feature transform) descriptor and a Harris corner detector. Of course, in addition to the algorithm using a captured image, other SLAM techniques, such as a range finder using RFID (radio frequency identification) or structured light, may be used to create the feature map.

However, a process of matching feature points captured by the mobile robot 100 with the position of the mobile robot 100 is needed to find the pose of the mobile robot 100 using the feature map. The position of the mobile robot 100 is provided by the position-measuring unit 120. That is, when the feature points obtained from the ceiling image are matched with the position of the mobile robot 100 to create the feature map, it is possible to easily know the pose of the mobile robot 100 by only comparing the feature points obtained from the captured image with the feature map.

The feature map created by the feature-map-creating unit 130 is stored in the memory 170. The memory 170 may be a non-volatile memory device, such as a ROM, a PROM, an EPROM, an EEPROM, or a flash memory, a volatile memory, such as a RAM, storage medium, such as a hard disk drive or an optical disk, or other known memory devices.

The obstacle-detecting unit 140 detects an obstacle on the moving path of the mobile robot 100. For example, the obstacle-detecting unit 140 may include an IR (infrared) sensor, an ultrasonic sensor, and a bumper.

The path-map-creating unit 150 measures the pose of the mobile robot 100 using the feature map provided from the feature-map-creating unit 130, and displays path information and whether an obstacle exists for each position of the mobile robot 100 (that is, for each cell), thereby creating a path map. The mobile robot 100 uses the path information to determine the direction in which the cleaning process and the map-creating process are performed. The path information is used to prevent the mobile robot 100 from passing through the position which the mobile robot 100 has passed through.

As described above, this exemplary embodiment of the invention uses a so-called dual map structure in which the feature map for knowing the pose of the mobile robot 100 and the path map for performing the cleaning process of the mobile robot 100 using the feature map are simultaneously created. The path map further includes information on the moving path of the mobile robot for the cleaning process, unlike the existing grid map. In the related art, the grid map is created, and then a path for cleaning is set. Therefore, it is only determined whether an obstacle exists to create the grid map, and thus path information is not included in the grid map.

The path-map-creating unit 150 uses the feature map created by the feature-map-creating unit 130 to measure the pose of the mobile robot, and creates the path map composed of the shapes of peripheral obstacles on the basis of information on the measured pose and information on obstacles provided by the obstacle-detecting unit 140. Then, the path-map-creating unit 150 stores the path map in the memory 170.

Figure 4:
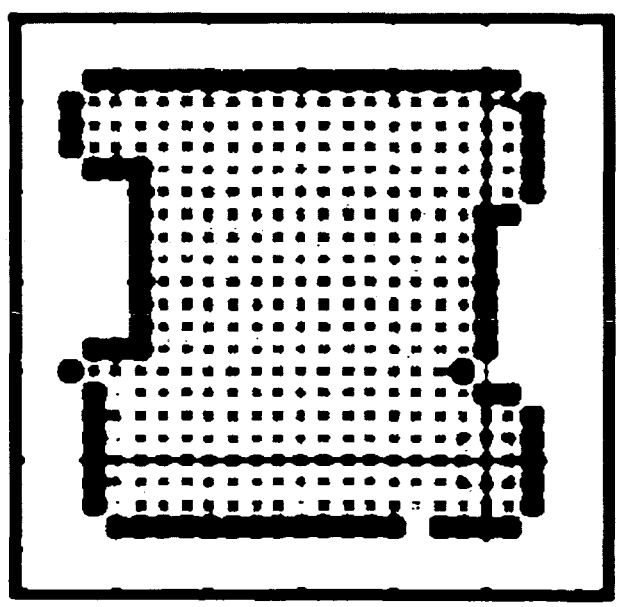
FIG. 4 is a diagram illustrating a grid map according to the related art.

The path map according to this exemplary embodiment is similar to the existing grid map shown in FIG. 4 in that it includes a plurality of cells. However, it differs from the existing grid map in that each cell of the path map includes path information in addition to information about whether an obstacle exists. The grid map shown in FIG. 4 displays only whether an obstacle exists.

The path-map-creating unit 150 uses information included in each cell of the path map (path map being created) to know the moving path of the mobile robot 100 and the direction in which the mobile robot 100 will move to clean the entire space. When the path map is surrounded by obstacles to form a looped curve and the mobile robot 100 passes through all of the cells, the entire space is cleaned and the path map is completely created. The operation of the path-map-creating unit creating the path map will be described in detail later with reference to FIGS. 5 to 12.

The motion-control unit 160 controls the mobile robot 100 to move a desired position determined by the path-map-creating unit 150. For example, the motion-control unit 160 may include a plurality of traveling wheels, a motor for driving the traveling wheels, and a motor controller for controlling the motor. The mobile robot 100 has a rectilinear motion by making the rotational speeds of the plurality of driving wheels equal to each other, and the mobile robot 100 has a curvilinear motion by making the rotational speeds of the plurality of driving wheels different from each other. In general, the traveling wheels are connected to the encoder.

The cleaning unit 180 may include a cleaning brush, a vacuum inhaler, and a steam generator. The cleaning unit 180 performs cleaning at the current position of the mobile robot 100 under the control of the path-map-creating unit 150.

The components shown in FIG. 1 may be composed software components, such as tasks, classes, sub-routines, processes, objects, execution threads, and programs, hardware components, such as a field-programmable gate array (FPGA) and an application specific integrated circuit (ASIC), or combinations of the software components and the hardware components. The components may be stored in a computer-readable storage medium, or they may be dispersed in a plurality of computers.

FIGS. 5 to 12 are diagrams illustrating the operation of the path-map-creating unit 150 creating the path map according to an exemplary embodiment of the invention.

Figure 5:
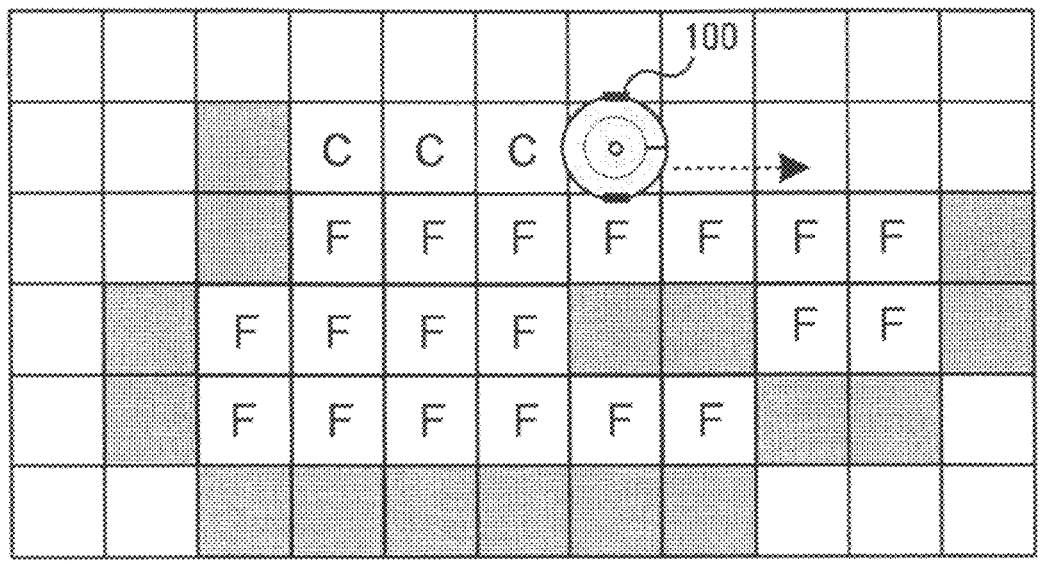
FIG. 5 is a diagram illustrating three types of indicators assigned to cells of a path map.

As show in FIG. 5, the path map includes cells having a predetermined size. Each of the cells includes path information and information about whether an obstacle exists. For example, each cell includes one (or a cell attribute) of a first indicator (a blocked cell) indicating that an obstacle is placed in the current cell, a second indicator (a cleaned cell) indicating that the current cell has already been cleaned, and a third indicator (a filled cell) indicating that one line including the current cell and sub-lines thereof have already been cleaned. The first symbol B and the second symbol F are included in information indicating to which cell the mobile robot 100 moves to perform cleaning, that is, path information. In FIGS. 5 to 12, the blocked cell is represented by a shaded area, the cleaned cell is represented by a character "C", and the filled cell is represented by a character "F".

Among the cells shown in the drawings, the cleaned cell can be changed to the filled cell later. This is because the cleaned cell indicates that the current cell has already been cleaned, but when a line including the current cell is completely cleaned, all of the cells included in the line can be changed to the filled cells.

Basically, the mobile robot 100 performs cleaning and creates the path map while moving from the left side to the right side. However, when a cleaning start point of the mobile robot 100 is not a leftmost point, the mobile robot 100 can move to the leftmost point. The path-map-creating unit 150 can check the current cell on the basis of the feature map provided from the feature-map-creating unit 130. While the mobile robot 100 is moving, the path-map-creating unit 150 reads the indicator the current cell, and performs cleaning when no indicator is marked in the current cell. If a character C or F is indicated in the current cell, the mobile robot 100 does not clean the cell, and moves to find a cell having no indicator. When the obstacle-detecting unit 140 detects an obstacle from the cell, the detected cell is indicated as the blocked cell.

In the present exemplary embodiment of the invention, a wall-fill method is used as the method of simultaneously performing the creation of a path map and cleaning. That is, when the space in the looped curve to be cleaned is fully filled from the bottom to the top, cleaning is completed. Therefore, when all of the cells included in a line underneath the line including the cell in which the mobile robot 100 is disposed are composed of the blocked cells or the filled cells, the cells included in the line having the cell in which the mobile robot 100 is disposed are changed from the cleaned cells to the filled cells.

Meanwhile, when slipping is detected in the current cell, the path-map-creating unit 150 stores the kind of slipping in the memory 170, and considers the current cell a dangerous area. Then, the mobile robot 100 moves along the path, considering the dangerous area. For example, it is determined whether the slipping occurs on the basis of whether the deviation between the current position measured by the encoder and the current position measured by the position-measuring unit 120 is larger than a threshold value.

FIGS. 6 to 12 are diagrams illustrating the operation of the mobile robot 100 creating the path map in the wall-fill method and performing cleaning.

Figure 6:
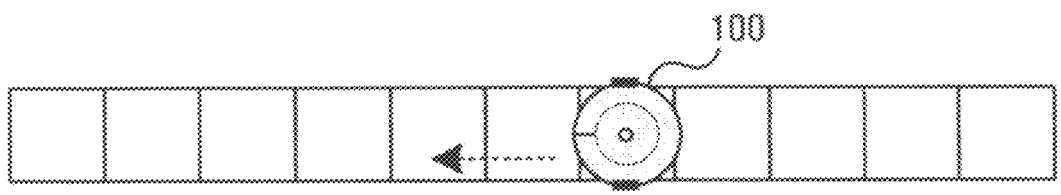
FIGS. 6 to 12 are diagrams illustrating the operation of the mobile robot simultaneously performing a cleaning process and a process of creating a path map by a water-fill method.

First, the mobile robot 100 cleans the cells without indicators while moving from an initial position to the left side, and marks indicators indicating the cleaned cells in the cells (see FIG. 6).

Figure 7:
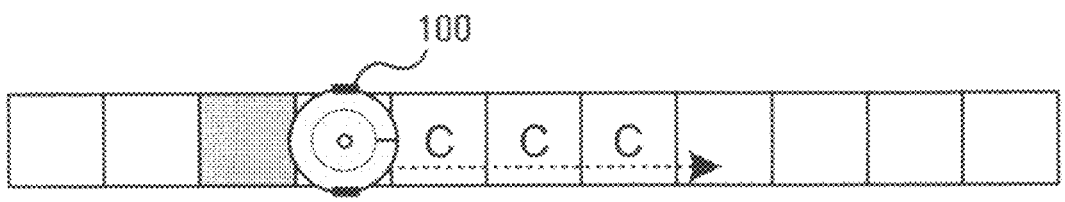

If the mobile robot 100 encounters an obstacle while moving to the left side, the mobile robot 100 assigns an indicator indicating the blocked cell in the cell in which the obstacle is placed, and then moves to the right side (see FIG. 7). When the mobile robot 100 encounters the cleaned cell while moving, the mobile robot 100 does not need to perform the cleaning of the cleaned cell.

Figure 8:
Figure 9:
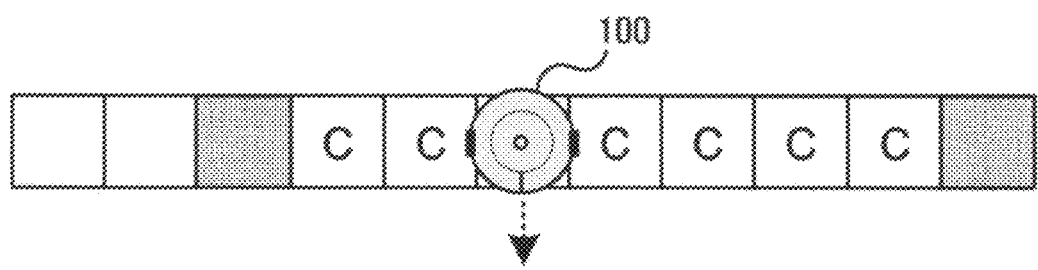

When the mobile robot 100 encounters an obstacle while moving to the right side, the mobile robot 100 assigns an indicator indicating the blocked cell in the cell in which the obstacle is placed (see FIG. 8). As such, when one line whose both ends are blocked is completely cleaned, the mobile robot 100 moves to another line underneath the line (see FIG. 9). This process is performed for each line.

Figure 10:
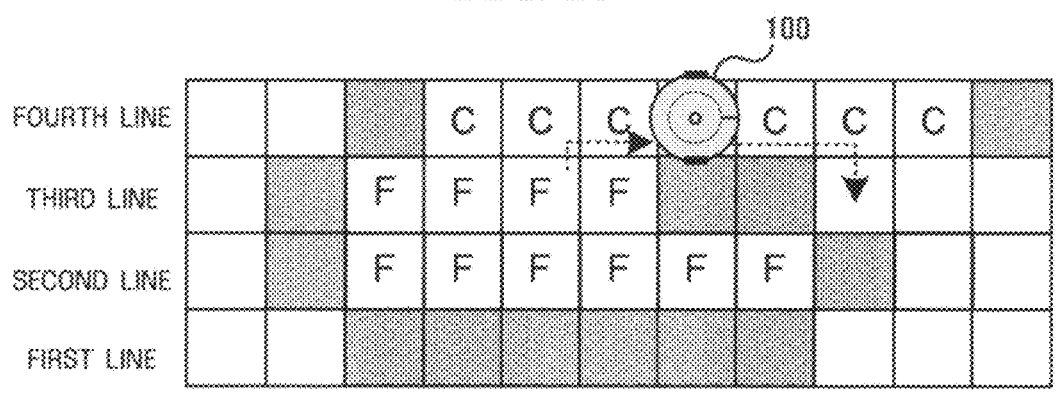

As shown in FIG. 10, six cells included in the second line are surrounded by the blocked cell in all directions, and are all represented as filled cells. Similarly, four cells included in the third lines are surrounded by filled cells and the blocked cells on the lower side and the left and right sides, respectively, and are represented as filled cells.

The mobile robot 100 assigns indicators indicating the filled cells in the cells included in the second and third lines, and returns to the fourth line. However, seven cleaned cells in the fourth line have not yet been changed to filled cells. This is because cells underneath two rightmost cells among the seven cells have no indicators. Therefore, the mobile robot 100 moves to the cells without indicators.

Figure 11:
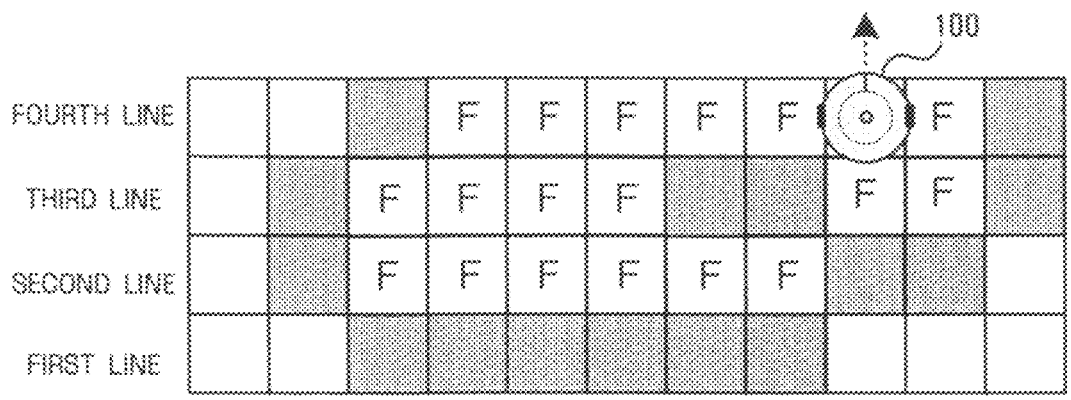

As shown in FIG. 11, when the mobile robot 100 processes the cells without indicators remaining in the first and second lines to the filled cells or the blocked cells, the seven cells in the fourth line are changed to the filled cells. As described above, when the mobile robot 100 moves to all of the areas in the first to fourth lines so that the areas are changed to the filled cells, the mobile robot 100 does not need to move to the lines in order to clean the lines.

Figure 12:
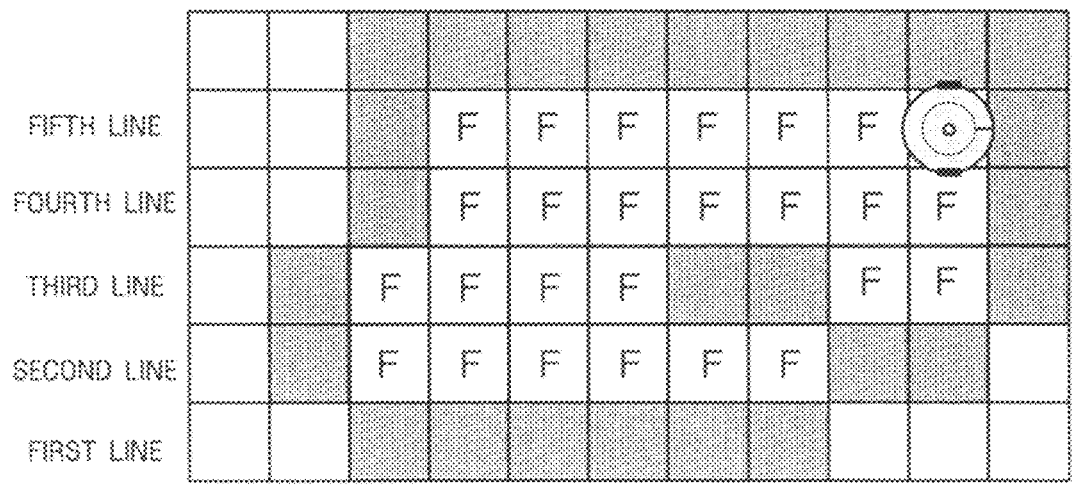

In order to continuously perform cleaning, the mobile robot 100 moves to the fifth line and assigns indicators in the cells in the fifth line while cleaning the cells (see FIG. 12). This process is repeatedly performed until the blocked cells form a looped curve. Then, as shown in FIG. 12, the space surrounded by the blocked cells is filled with the filled cells.

In this way, a path map 50 shown in FIG. 12 is completed at the same time as cleaning is completed. Then, when a space included in the path map 50 needs to be cleaned, the mobile robot can easily perform cleaning using the created path map 50.

FIG. 13 is a flowchart illustrating a method of creating a map for a mobile robot according to an exemplary embodiment of the invention.

First, a sensing process (S60) is performed by the image-capturing unit 110, the position-measuring unit 120, and the obstacle-detecting unit 140 of the mobile robot. In the sensing process (S60), the image-capturing unit 110 captures a ceiling image and processes the captured image (S61), the position-measuring unit 120 measures the current position of the mobile robot 100 using a positioning module, such as a gyro-sensor, an acceleration sensor, and/or an encoder (S62), and the obstacle-detecting unit 140 processes a detection signal related to a detected obstacle (S63).

Thereafter, the feature-map-creating unit 130 creates a feature map from the captured ceiling image on the basis of the position measured by the position-measuring unit 120, and updates the feature map in real time, that is, performs a SLAM process S65.

The path-map-creating unit 150 creates a path map on the basis of the pose of the mobile robot 100 provided from the feature-map-creating unit 130, and updates the path map in real time S70. A process of creating the path map is performed as shown in FIGS. 5 to 12. In the process of creating the path map, the path-map-creating unit 150 controls the mobile robot 100 to move a necessary position S75.

When the entire area is completely cleaned (YES in S80), the process ends. If not (NO in S80), the process is repeated from S60.

In addition to the above described embodiments, embodiments of the present invention can also be implemented through computer readable code/instructions in/on a computer-readable recording medium/media, to control at least one processing element to implement any above described embodiment. The computer-readable recording medium/media can correspond to any medium/media permitting the storing of the computer readable code/instructions.

Examples of computer-readable recording medium/media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), a CD-R (Recordable)/Rewritable, and DVD-R (Recordable/Rewritable). The computer-readable recording media may also be a distributed network, so that the computer readable code/instructions is/are stored and executed in a distributed fashion. Still further, as only an example, the processing element could include a processor or a computer processor, and processing elements may be distributed and/or included in a single device.

For example, embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing embodiments may be recorded on computer-readable recording medium/media as discussed above.

Further, according to an aspect of embodiments, any combination of the described features, functions and/or operations can be implemented.

In addition to the above described embodiments, embodiments of the present invention can also be implemented using computer readable code/instructions transmitted on/through a transmission medium/media, to control at least one processing element to implement any above described embodiment. An example of a transmission medium/media is a carrier wave transmitting computer readable code/instructions through the Internet or other network. A transmission medium/media is different from a computer-readable recording medium/media.

According to the above-described exemplary embodiments, it is possible to simultaneously perform a cleaning process and a map-creating process using a dual structure map (a feature map and a path map). As a result, a cleaning time is remarkably reduced, and a separate map-creating process is not needed.

According to the above-described exemplary embodiments, since a map-creating process and a cleaning process are simultaneously performed, a complicated map-creating-path-planning algorithm is not needed.

Further, according to the above-described exemplary embodiments, it is possible to increase the size of a cell in the path map to the size of a cleaning brush of the cleaning robot, and thus reduce the amount of processing and the memory capacity.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for simultaneously performing a cleaning process and a map creating process for a mobile robot, comprising:
    a feature-map-creating unit to create a feature map for recognizing position of the mobile robot;
    a path-map-creating unit to create a path map including a plurality of cells, each cell having information about whether an obstacle exists and path information, on the basis of information on pose of the mobile robot that is obtained from the feature map, and to display path information and whether the obstacle exists in each cell; and a motion control unit to move the mobile robot on the basis of the information about whether the obstacle exists and the path information, wherein the path-map-creating unit assigns to the cell one of a first indicator indicating that the obstacle exists, a second indicator indicating whether the cell is completely cleaned, and a third indicator indicating whether current line including the cell and a line underneath the current line are completely cleaned.

2. The apparatus of claim 1, further comprising:

an image-capturing unit to capture a peripheral image suitable for extracting feature points; and a position-measuring unit to measure the position of the mobile robot using a relative-position-recognizing module, wherein the feature map is created by a method of matching the feature points extracted from the peripheral image with the measured position.

3. The apparatus of claim 2, wherein the relative-position-recognizing module includes at least one of a gyro-sensor, an acceleration sensor, and an encoder.

4. The apparatus of claim 2, wherein the peripheral image is a ceiling image, a wall image, or a floor image.

5. The apparatus of claim 1, wherein the path information comprises information indicating whether a specific cell has been completely cleaned and information indicating whether current line including the specific cell and a line underneath the current line are completely cleaned.

6. The apparatus of claim 1, wherein the path map is created by a wall-fill method.

7. The apparatus of claim 1, wherein, when the second indicator is assigned to the cell and the current line including the cell and a line underneath the current line are completely cleaned, the path-map-creating unit changes the second indicator to the third indicator.

8. The apparatus of claim 1, wherein the creation of the path map is repeatedly performed until a looped curve is formed by obstacles and the third indicators are assigned to all of the cells in the looped curve.

9. A method for simultaneously performing cleaning and creating a map for a mobile robot, comprising:

creating a feature map for recognizing position of the mobile robot;

creating a path map including a plurality of cells, each cell having information about whether an obstacle exists and path information, on the basis of information on pose of the mobile robot that is obtained from the feature map, and displaying path information and whether the obstacle exists in each cell;

moving the mobile robot on the basis of the information about whether the obstacle exists and the path information, wherein:

the creating of the path map comprises:

moving the mobile robot to one of a plurality of cells included in a line which the mobile robot has not passed through, until both ends of the line are blocked by obstacles;

when both ends of the line are blocked by the obstacles, moving the mobile robot to the next line; and repeatedly performing the processes until a looped curve is formed by the obstacles; and assigning, to each of the cells forming the path map, one of a first indicator indicating that obstacle exists, a second indicator indicating whether the cell is completely cleaned, and a third indicator indicating whether current line including the cell and a line underneath the current line have been completely cleaned.

10. The method of claim 9, further comprising:

capturing a peripheral image suitable for extracting feature points; and measuring position of the mobile robot using a relative-position-recognizing module, wherein the feature map is created by matching the feature points extracted from peripheral image with the measured position.

11. The method of claim 10, wherein the relative-position-recognizing module includes at least one of a gyro-sensor, an acceleration sensor, and an encoder.

12. The method of claim 10, wherein the peripheral image is a ceiling image, a wall image, or a floor image.

13. The method of claim 9, wherein the path information comprises information indicating whether a specific cell has been completely cleaned and information indicating whether current line including the specific cell and a line underneath the current line have been completely cleaned.

14. The method of claim 9, further comprising:

when the second indicator is assigned to cell and the current line including the cell and a line underneath the current line are completely cleaned, changing the second indicator to the third indicator.

15. The method of claim 9, further comprising:

when the mobile robot slips, considering cell in which the slipping has occurred a dangerous area and controlling the mobile robot to avoid the cell.

16. At least one computer-readable recording medium storing instructions that control at least one processing element to implement the method of claim 9.

* * * * *